W. S. BALL.
METHOD OF AND APPARATUS FOR TAKING MOVING PICTURES.
APPLICATION FILED MAR. 25, 1916.
1,351,502.
Patented Aug. 31, 1920.
2 SHEETS—SHEET 1.
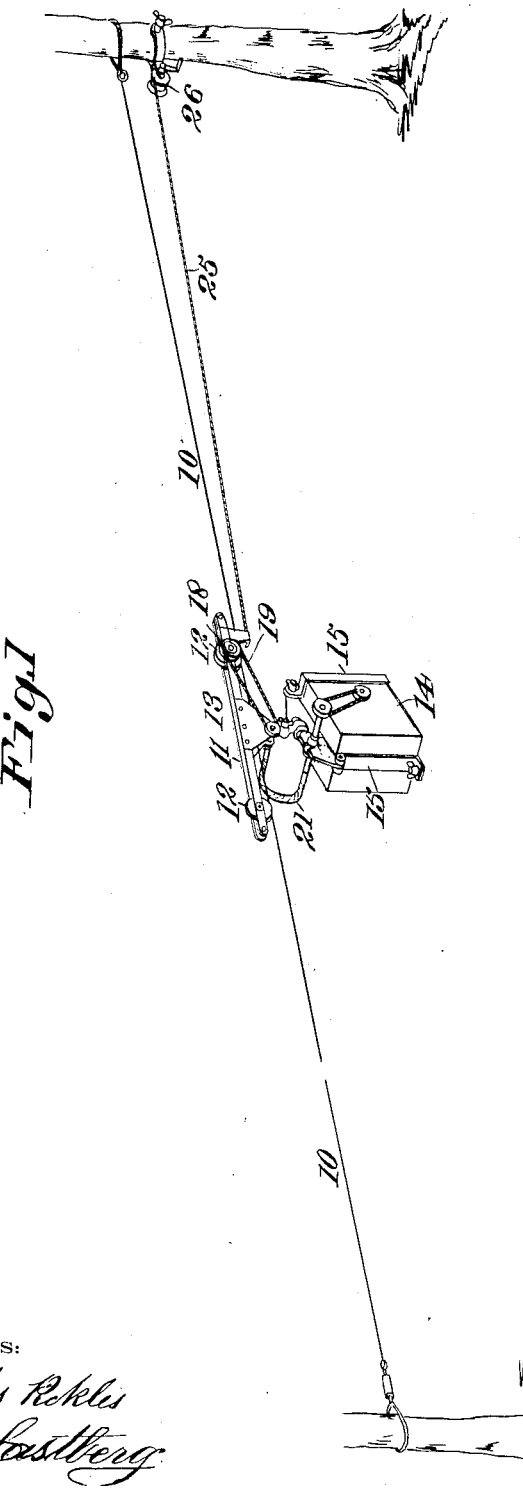
WITNESSES:
Charles Rickles
Thos Castlberg
INVENTOR
Waldon S. Ball
BY Strong & Townsend
ATTORNEYS

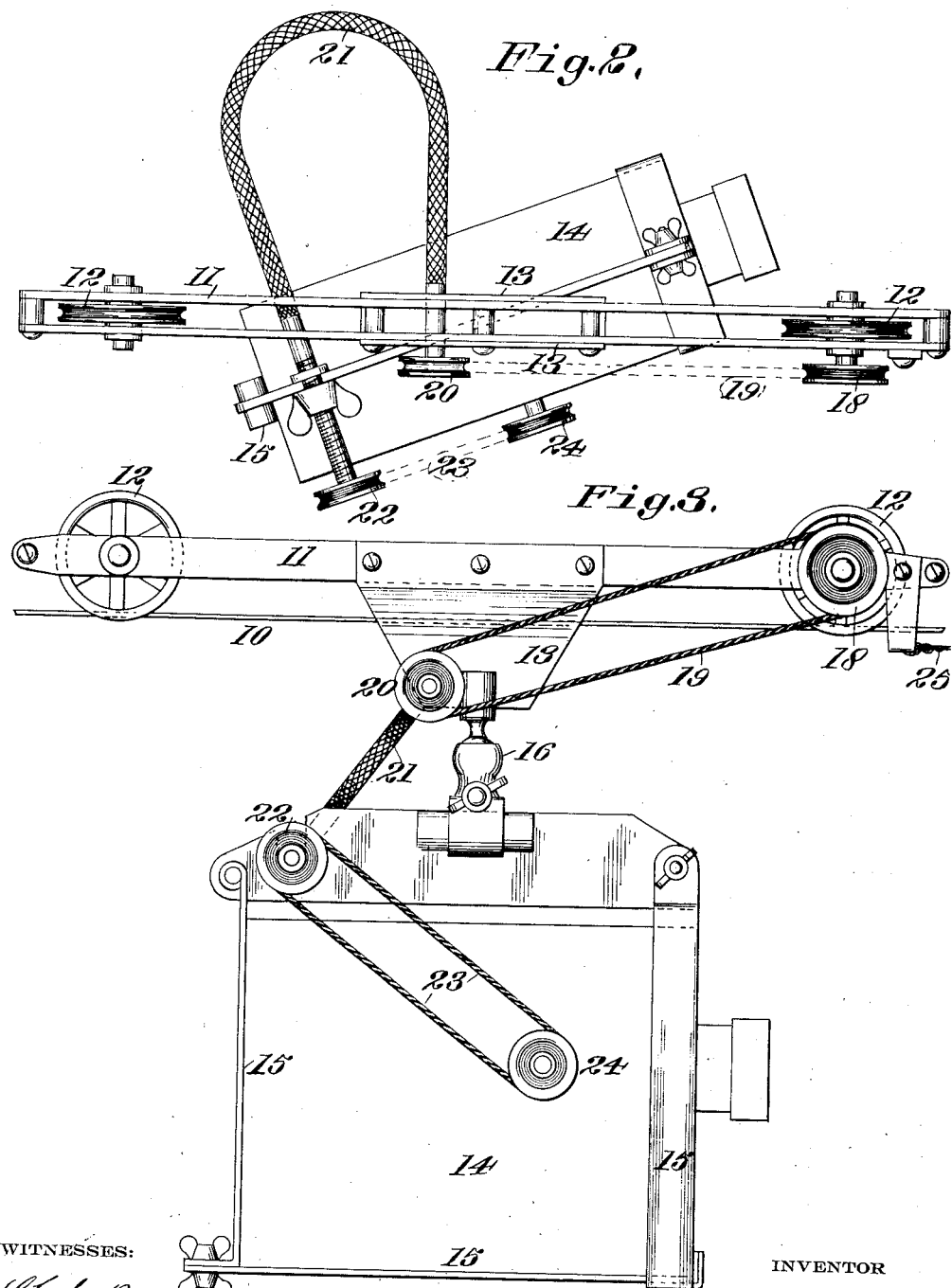

UNITED STATES PATENT OFFICE.

WALDON S. BALL, OF SAN FRANCISCO, CALIFORNIA, ASSIGNOR, BY MESNE ASSIGNMENTS, TO STEREOSCOPIC MOTION PICTURE COMPANY, A CORPORATION OF CALIFORNIA.

METHOD OF AND APPARATUS FOR TAKING MOVING PICTURES.

1,351,502.  Specification of Letters Patent.  Patented Aug. 31, 1920.

Application filed March 25, 1916. Serial No. 86,607.

*To all whom it may concern:*

Be it known that I, WALDON S. BALL, a citizen of the United States, residing at the city and county of San Francisco and State of California, have invented new and useful Improvements in Methods of and Apparatus for Taking Moving Pictures, of which the following is a specification.

This invention relates to motion picture photography; and has for its object to obtain new and improved results in the photographing of objects with the subjects appearing in relief.

I find it is possible to secure relief effects in motion pictures if the objects be photographed by a shifting of a camera in such a way that each exposure or picture be taken at a different point and spaced uniformly in accordance with the conditions governing. The speed of travel of the camera and the speed of exposure of the film should be in timed relation, which relation, to secure the best results, should be established by the distance which separates the photographed object from the camera. Pictures can be so taken with an ordinary motion picture camera and, when projected with ordinary apparatus and viewed without special optical instruments, reveal a remarkably clear depthness or relief. The results obtained cannot be called true stereoscopic effects, but provide pictures in which the subjects appear in relief without being blurred or distorted and thus cause them to have a very life-like appearance.

My invention consists in the method of taking motion pictures by shifting the position of the camera to traverse the prospect of the object being photographed, whereby to obtain relief effects, and in an apparatus for the proper timing of the travel of the camera and feed of the film, whereby to obtain improved and uniform results in such photography.

One form which my invention may assume is exemplified in the following description and illustrated in the accompanying drawings, in which—

Figure 1 shows a perspective view of a device embodying my invention.

Fig. 2 shows a plan view of the roller carriage and camera employed.

Fig. 3 shows a side elevation of the device shown in Fig. 2.

Referring in detail to the drawings, I have shown a cable or track 10, supported in any desired manner and extending along the line through which the camera is to be moved. A carriage 11, fitted with rollers 12, is supported upon and travels over the track or cable 10 and has suspended from it, by means of a yoke 13, a suitable form of motion picture camera 14. A detachable skeleton frame 15 receives the camera, and between the frame and the yoke 13 is a swivel joint 16, held in adjusted position by a set-screw 17, whereby the camera can be made to occupy any desired angle relative to the track or carriage.

One of the rollers 12 carries a driving pulley 18, over which runs a belt 19 connecting with a counter-driving pulley 20 journaled on the yoke 13. From the counter-driving pulley 20 extends a flexible shaft 21 connecting with a pulley 22 journaled on the upper portion of the frame 15. Pulley 22 is connected to and drives, by means of a belt 23, a pulley 24 on the film spool (not shown), said pulley 24 serving to replace the usual hand-crank employed in motion picture cameras for feeding the film. A rope 25, or other suitable propelling device, is attached to the carriage for drawing the latter along its track and a winding drum 26, stationarily mounted, may be employed in connection with the rope for imparting a smooth and even travel to the carriage.

In the operation of this invention, the apparatus shown and described is quickly and easily set up in any desired position and over as long a course as is desired. The camera is then pointed in the direction of the object to be photographed and the operator from a point outside the range of the camera draws the carriage along its track by means of the rope and winding drum. The rotation of the supporting rollers 12 transmits motion to the film through the connections described and a perfect timing is thus obtained between the travel of the camera and the feed of the film. Any desired relation of movement may be established between these parts by varying the sizes of the driving or driven pulleys.

Due to the fact that the camera employed is constructed to make exposures successively and in direct relation to the movement of the camera there will be a direct relation between the relative speed of movement of the camera and the interval between exposures of the film. This will cause successive exposures to be made at stations a very short distance apart and which stations will occur at equal intervals along the path of travel of the camera. The result will be that a panoramic view will be made to be represented by a series of pictures. These pictures will, of course, show the various aspects of the scene in slightly altered relation to each other and will thus cause the picture, as thrown upon the screen, to appear with the various objects in strong relief. This result is obtained due to the fact that the various exposures will be taken from successive stations and will therefore produce an effect analogous to that which would be obtained by making successive exposures through a plurality of eye-pieces focused in parallel relation to each other and spaced equidistant from each other. This method of obtaining panoramic views by means of motion picture projecting machines is especially valuable for use with out-of-door subjects, as the relative movement of the camera with relation to the subject will be very slight and will not cause the scene to become out of focus during the movement of the camera.

The distance which the camera moves between successive exposures should be regulated in accordance with the distance which separates the object from the lens, on the principle that to obtain sterescopic effects of distant objects the optical points should be spaced farther apart than when viewing close-up objects. This spacing is obtained by adjusting the relative sizes of the pulleys 18—20, still propelling the camera so that the feed of the film remains substantially the same at all times, i. e. about sixteen exposures per second. Once the proper relation is established for a particular set-up, it preferably remains undisturbed. With some experience the operator can determine without much difficulty the approximate relation of movement required to give stereoscopic effects. Should the correct spacing of the points of exposure be disregarded, the pictures will have a jumping or blurred effect and, in fact, may give no stereoscopic effect at all.

While I have shown and described but one form of apparatus herein, it will be understood, nevertheless, that the same is susceptible of modifications, and, therefore, many changes in the construction and arrangement of the several parts may be employed without departing from the spirit of my invention as disclosed in the appended claims.

As shown in the drawings, the camera is preferably turned so that the axis of its lens is obliquely disposed with reference to the track 10, by reason of which the movement of the camera becomes a combination of sidewise and fore and aft movement with respect to the scene being photographed. As a result of this the scene does not change as rapidly as if the axis of the lens were at right angles to the track.

Having thus described my invention, what I claim and desire to secure by Letters Patent is—

1. An apparatus for taking photographic views, comprising in combination a motion picture camera, a track, a roller carriage on said track to receive the camera, and operative connections between one of the carriage rollers and the film-feeding device.

2. An apparatus for taking photographic views, comprising, in combination, a track, a roller carriage movable thereon, a motion picture camera suspended from said carriage, a swivel connection between the camera and the carriage for adjusting the camera angularly, and operative connections between one of the rollers of said carriage and the film-feeding device of the camera.

3. An apparatus for taking photographic views, comprising, in combination, a track, a roller carriage movable thereon, a motion picture camera suspended from said carriage, a swivel connection between the camera and the carriage for adjusting the camera angularly, and a flexible driving shaft between one of the rollers of said carriage and the film-feeding device of the camera.

4. An apparatus for taking photographic views, comprising, in combination, a cable, a roller carriage movable along said cable, a motion picture camera suspended from said carriage, operative connections between one of the rollers of the carriage and the film-feeding device on the camera, and means for propelling said carriage along the track.

5. An apparatus for taking motion pictures, comprising, in combination, a track, a roller carriage movable along said track to traverse the prospect of the object being photographed, a motion picture camera suspended from said carriage, and means operated by the travel of the carriage for feeding the film of the camera, the speed of travel of the camera being timed with relation to the distance between the camera and the object photographed, whereby to obtain successive photographic exposures of the changing scene at various points in the travel of the camera spaced uniformly.

In testimony whereof I have hereunto set my hand in the presence of two subscribing witnesses.

WALDON S. BALL.

Witnesses:
JOHN H. HERRING,
W. W. HEALEY.